(12) United States Patent
Kim et al.

(10) Patent No.: US 12,519,173 B2
(45) Date of Patent: Jan. 6, 2026

(54) BATTERY MODULE AND BATTERY PACK INCLUDING THE SAME

(71) Applicant: LG ENERGY SOLUTION, LTD., Seoul (KR)

(72) Inventors: Tae Geun Kim, Daejeon (KR); Hyuk An, Daejeon (KR); Sangwook Yim, Daejeon (KR); Young Bin Lee, Daejeon (KR); Hyoungsuk Lee, Daejeon (KR); Young Il Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 477 days.

(21) Appl. No.: 18/024,896

(22) PCT Filed: May 25, 2022

(86) PCT No.: PCT/KR2022/007398
§ 371 (c)(1),
(2) Date: Mar. 6, 2023

(87) PCT Pub. No.: WO2022/270777
PCT Pub. Date: Dec. 29, 2022

(65) Prior Publication Data
US 2023/0361413 A1 Nov. 9, 2023

(30) Foreign Application Priority Data
Jun. 21, 2021 (KR) .................. 10-2021-0080124

(51) Int. Cl.
*H01M 50/276* (2021.01)
*H01M 10/613* (2014.01)
(Continued)

(52) U.S. Cl.
CPC ....... *H01M 50/276* (2021.01); *H01M 10/613* (2015.04); *H01M 10/647* (2015.04);
(Continued)

(58) Field of Classification Search
CPC ............. H01M 50/276; H01M 50/209; H01M 50/211; H01M 50/224; H01M 50/262;
(Continued)

(56) References Cited

U.S. PATENT DOCUMENTS

| 2008/0057393 A1 | 3/2008 | Onuki et al. |
| 2013/0095356 A1 | 4/2013 | Shimizu et al. |

(Continued)

FOREIGN PATENT DOCUMENTS

| CN | 103081164 A | 5/2013 |
| CN | 108028336 A | 5/2018 |

(Continued)

OTHER PUBLICATIONS

International Search Report, issued in PCT/KR2022/007398, dated Aug. 31, 2022.

*Primary Examiner* — Eugenia Wang
(74) *Attorney, Agent, or Firm* — Birch, Stewart, Kolasch & Birch, LLP (57) ABSTRACT

Discussed is a battery module that may include a battery cell assembly including a first battery cell assembly and a second battery cell assembly in which a plurality of battery cells are stacked, respectively; an upper frame that houses an upper surface and opposite side surfaces of the battery cell assembly and is opened in front and rear surfaces; a lower frame that houses a lower surface and the opposite side surfaces of the battery cell assembly and is opened in front and rear surfaces; and end plates that are respectively located on a surface that is adjacent to an outer side from among front and rear surfaces of the first battery cell assembly and a (Continued)

surface that is adjacent to an outer side among front and rear surfaces of the second battery cell assembly, wherein the first battery cell assembly and the second battery cell assembly are arranged separately in a direction facing each other, and wherein the upper frame includes a material having a melting point higher than a melting point of a material constituting the lower frame.

20 Claims, 8 Drawing Sheets

(51) Int. Cl.
| | | |
|---|---|---|
| *H01M 10/647* | (2014.01) | |
| *H01M 10/6556* | (2014.01) | |
| *H01M 50/209* | (2021.01) | |
| *H01M 50/211* | (2021.01) | |
| *H01M 50/224* | (2021.01) | |
| *H01M 50/262* | (2021.01) | |
| *H01M 50/271* | (2021.01) | |
| *H01M 50/358* | (2021.01) | |
| *H01M 50/367* | (2021.01) | |

(52) U.S. Cl.
CPC ..... *H01M 10/6556* (2015.04); *H01M 50/209* (2021.01); *H01M 50/211* (2021.01); *H01M 50/224* (2021.01); *H01M 50/262* (2021.01); *H01M 50/271* (2021.01); *H01M 50/358* (2021.01); *H01M 50/367* (2021.01)

(58) Field of Classification Search
CPC ............. H01M 50/271; H01M 50/358; H01M 50/367; H01M 50/3425; H01M 50/24; H01M 50/249; H01M 10/613; H01M 10/647; H01M 10/6556; H01M 10/6554; H01M 10/6551; H01M 2200/10; H01M 2220/20; Y02E 60/10
See application file for complete search history.

(56) References Cited

U.S. PATENT DOCUMENTS

| | | | |
|---|---|---|---|
| 2014/0023906 A1* | 1/2014 | Hashimoto | ......... H01M 10/625 |
| | | | 429/157 |
| 2017/0054124 A1 | 2/2017 | Yoon | |
| 2019/0173064 A1 | 6/2019 | Lee et al. | |
| 2020/0411814 A1 | 12/2020 | Ju et al. | |
| 2021/0050573 A1 | 2/2021 | Lee | |
| 2021/0320362 A1 | 10/2021 | Lee et al. | |
| 2021/0336287 A1 | 10/2021 | Kim et al. | |
| 2022/0231376 A1 | 7/2022 | Yoo et al. | |
| 2022/0284074 A1 | 9/2022 | Naitoh et al. | |

FOREIGN PATENT DOCUMENTS

| | | |
|---|---|---|
| CN | 208189681 U | 12/2018 |
| CN | 111416076 A | 7/2020 |
| CN | 112335097 A | 2/2021 |
| CN | 212461878 U | 2/2021 |
| CN | 212967875 U | 4/2021 |
| CN | 213071273 U | 4/2021 |
| JP | 4965012 B2 | 7/2012 |
| KR | 10-0686802 B1 | 2/2007 |
| KR | 10-2008-0022485 A | 3/2008 |
| KR | 10-2017-0022783 A | 3/2017 |
| KR | 10-2019-0074759 A | 6/2019 |
| KR | 10-2096402 B1 | 4/2020 |
| KR | 10-2020-0086170 A | 7/2020 |
| KR | 10-2020-0143099 A | 12/2020 |
| KR | 10-2021-0068862 A | 6/2021 |
| KR | 10-2266391 B1 | 6/2021 |
| WO | WO 2012/133708 A1 | 10/2012 |
| WO | WO 2021/049315 A1 | 3/2021 |

* cited by examiner

BATTERY MODULE AND BATTERY PACK INCLUDING THE SAME

TECHNICAL FIELD

Cross Citation with Related Application(s)

This application claims the benefit of Korean Patent Application No. 10-2021-0080124 filed on Jun. 21, 2021 with the Korean Intellectual Property Office, the disclosure of which is incorporated herein by reference in its entirety.

The present disclosure relates to a battery module and a battery pack including the same, and more particularly to a battery module having improved safety and venting performance and a battery pack including the same.

BACKGROUND

Along with the technology development and increased demand for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, the battery module may include a module frame whose front and rear surfaces are opened to house the battery cell stack in the internal space, in order to protect the battery cell stack from external impact, heat or vibration.

In addition, when a part of battery modules become an overvoltage, overcurrent or overheat state, the safety and operating efficiency of the battery module may be problematic. In particular, in order to improve the mileage, the battery module capacity tends to gradually increase, whereby it is necessary to design a structure that meets the strengthened safety standards and ensures the safety of vehicles and drivers. For this purpose, the necessity a structure capable of effectively discharging gases and flames generated in a part of battery cells and thus minimizing the damage is uprising.

However, the gas and/or flame generated by the ignition phenomenon of some battery cells in the battery module has a relatively high temperature, and thus, when the material constituting the components of the battery module is susceptible to a high temperature, it may not be suitable for discharging high-temperature gas and/or flame. In particular, in the case of components adjacent to the discharge path of high-temperature gas and/or flame among the components of the battery module, it needs to be made of a material that is not susceptible to high temperatures.

Therefore, there is a need to develop a battery module capable of safely and effectively discharging gases and/or flames generated by the ignition phenomenon of some battery cells in the battery module, and a battery pack including the same.

DETAILED DESCRIPTION OF THE INVENTION

Technical Problem

It is an object of the present disclosure to provide a battery module having improved safety and venting performance and a battery pack including the same.

The objects of the present disclosure are not limited to the aforementioned objects, and other objects which are not described herein should be clearly understood by those skilled in the art from the following detailed description and the accompanying drawings.

Technical Solution

According to an aspect of the present disclosure, there is provided a battery module including: a battery cell assembly including a first battery cell assembly and a second battery cell assembly in which a plurality of battery cells are stacked, respectively; an upper frame that houses an upper surface and opposite side surfaces of the battery cell assembly and is opened in front and rear surfaces; a lower frame that houses a lower surface and opposite side surfaces of the battery cell assembly and is opened in front and rear surfaces; and end plates that are respectively located on a surface that is adjacent to an outer side from among front and rear surfaces of the first battery cell assembly and a surface that is adjacent to the outer side from among front and rear surfaces of the second battery cell assembly, wherein the first battery cell assembly and the second battery cell assembly are arranged separately in a direction facing each other, and wherein the upper frame includes a material having a melting point higher than a melting point of a material constituting the lower frame.

The venting cover may include a venting part that extends along a longitudinal direction of the upper frame and protrudes outward with respect to an upper surface of the upper frame.

The upper surface of the upper frame may constitute a bottom surface of the venting cover.

The venting part may have a shape that is bent a plurality of times along a width direction of the battery cell assembly.

The venting part includes a first venting part and a second venting part, the first venting part extends along a longitudinal direction of the first battery cell assembly, and the second venting part may extend along a longitudinal direction of the second battery cell assembly.

A central part of the venting cover is in contact with the upper surface of the upper frame, and the first venting part and the second venting part may be separated from each other with respect to the central part of the venting cover.

The upper frame may include at least one venting hole communicating with the venting part.

The at least one venting hole may include a first venting hole and a second venting hole, the first venting hole is located adjacent to one surface facing the second battery cell assembly among the front and rear surfaces of the first battery cell assembly, and the second venting hole may be located adjacent to one surface facing the first battery cell assembly among the front and rear surfaces of the second battery cell assembly.

The at least one venting hole may extend along a width direction of the battery cell assembly.

The lower frame may include a partition wall part that is located between the first battery cell assembly and the second battery cell assembly.

One of the opposite side surfaces of the upper frame has a first outer peripheral surface that is bent outward with respect to the upper frame, one of the opposite side surfaces of the lower frame has a second outer peripheral surface that is bent outward with respect to the lower frame, and the first outer peripheral surface and the second outer peripheral surface may be in contact with each other.

The first outer peripheral surface and the second outer peripheral surface may be fixed by a bolt coupling.

A first gasket part may be located between the first outer peripheral surface and the second outer peripheral surface.

At least one of the end plates may include a third outer peripheral surface that is bent outward with respect to the at least one of the end plates, the first outer peripheral surface extends along the front and rear surfaces of the upper frame, respectively, and the first outer peripheral surface and the third outer peripheral surface may be in contact with each other.

The first outer peripheral surface and the third outer peripheral surface may be fixed by a bolt coupling.

A second gasket part may be located between the first outer peripheral surface and the third outer peripheral surface.

At least one of the end plates may include at least one venting valve.

The upper frame may include a steel material, and the lower frame may include an aluminum material.

The battery module may further include a heat sink located under the lower frame, wherein the heat sink may include a recessed part that is recessed in a direction opposite to a direction toward a bottom surface of the lower frame, and the bottom surface of the lower frame may constitute an upper surface of the heat sink.

According to another aspect of the present disclosure, there is provided a battery pack that may include the above-mentioned battery module.

Advantageous Effects

According to embodiments, the battery module of the present disclosure and a battery pack including the same is composed of a material in which the upper frame has a melting point higher than the melting point of the material constituting the lower frame, thereby capable of improving safety and venting performance.

The effects of the present disclosure are not limited to the effects mentioned above and additional other effects not described above will be clearly understood from the detailed description and the appended drawings by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, areas, etc. are exaggerated for clarity. In the drawings, for convenience of description, the thicknesses of some layers and areas are exaggerated.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Below, the battery module according to an embodiment of the present disclosure will be described.

Figure 1:
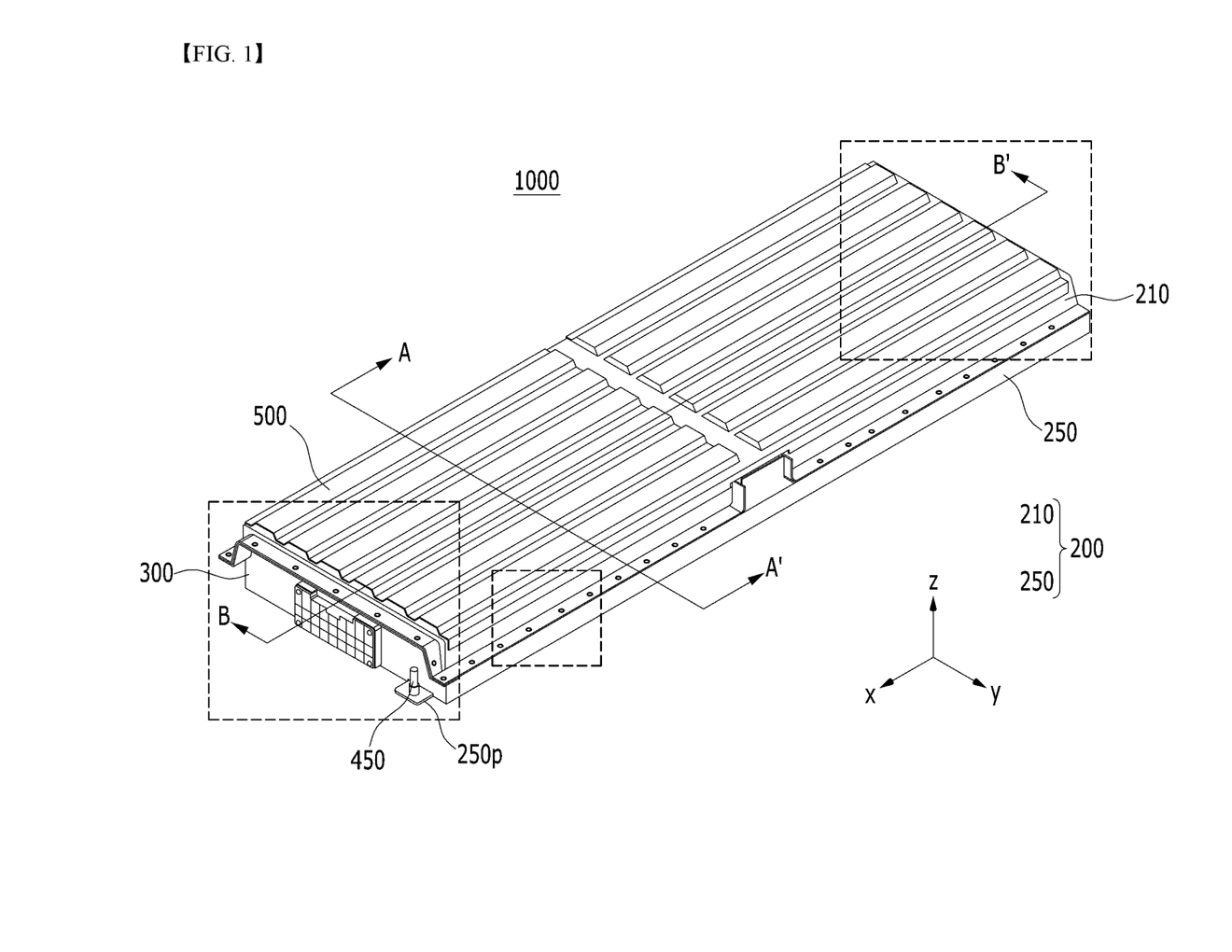
FIG. 1 is a perspective view showing a battery module according to an embodiment of the present disclosure.
Figure 2:
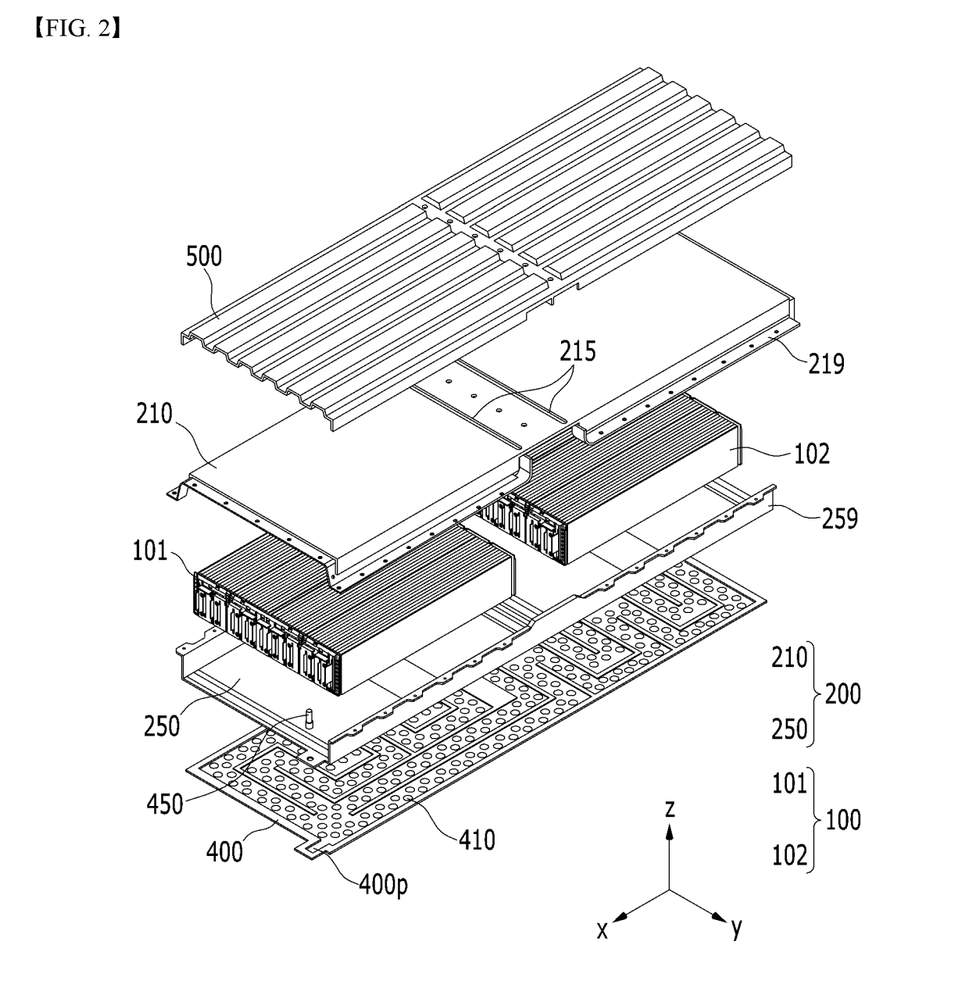
FIGS. 2 and 3 are exploded perspective views of the battery module of FIG. 1.
Figure 3:
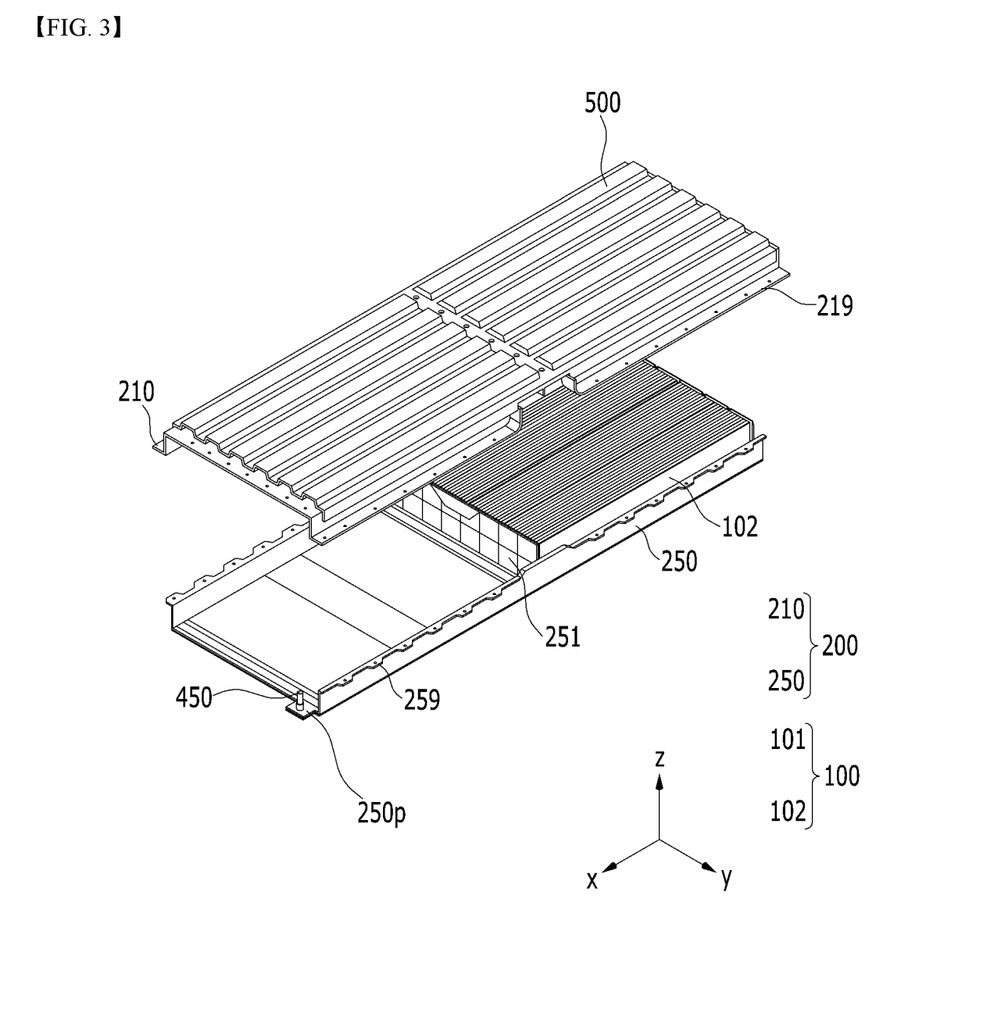

FIG. 1 is a perspective view showing a battery module according to an embodiment of the present disclosure. FIGS. 2 and 3 are exploded perspective views of the battery module of FIG. 1.

Referring to FIGS. 1 to 3, the battery module 1000 according to an embodiment of the present disclosure includes a battery cell assembly 100 including a first battery cell assembly 101 and a second battery cell assembly 102 in which a plurality of battery cells are stacked, respectively, an upper frame 210 that houses an upper surface and both side surfaces of the battery cell assembly 100 and is opened in its front and rear surfaces, a lower frame 250 that houses the lower surface and both side surfaces of the battery cell assembly 100 and is opened in its front and rear surfaces; and end plates 300 that are respectively located on a surface adjacent to the outer side among the front and rear surfaces of the first battery cell assembly 101 and a surface adjacent to the outer side among the front and rear surfaces of the second battery cell assembly 102.

Here, the end plate 300 may be made of the same material as the lower frame 250, so that the front and rear surfaces of the lower frame 250 and the end plate 300 can be fixed to each other by a method such as weld-joining. However, the present disclosure is not limited thereto, and any fixing method capable of sealing the inside of the module frame 200 from the external environment can be included in the present embodiment.

Here, the battery cell assembly 100 includes a first battery cell assembly 101 and a second battery cell assembly 102. More specifically, the first battery cell assembly 101 and the second battery cell assembly 102 are arranged separately in a direction facing each other. Here, the direction facing each other may be a direction in which the front or rear surface of the first battery cell assembly 101 and the front or rear surface of the second battery cell assembly 102 face each other. More preferably, the direction facing each other is a direction in which the front surface of the first battery cell assembly 101 and the front surface of the second battery cell assembly 102 face each other, or may be a direction in which the rear surface of the first battery cell assembly 101 and the rear surface of the second battery cell assembly 102 face each other. However, the first battery cell assembly 101 and the second battery cell assembly 102 only differ according to their positions, and may be battery cell assemblies that are manufactured identically to each other.

Further, the battery cell assembly 100 may be formed by stacking a plurality of battery cells. Here, the battery cell is preferably a pouch-type battery cell. As an example, the battery cell can be manufactured by housing the electrode assembly in a pouch case of a laminated sheet containing a resin layer and an inner layer, and then thermally sealing a sealing part of the pouch case. Further, the battery cell may be formed in a rectangular sheet-like structure. Moreover, the battery cell may be configured in plural numbers, and a plurality of battery cells are stacked so as to be electrically connected to each other, thereby forming the battery cell assembly 100.

Here, the module frame 200 may include an upper frame 210 and a lower frame 250. More specifically, the upper frame 210 houses the upper surface and both side surfaces of the battery cell assembly 100, and may be a U-shaped frame that is opened in its front and rear surfaces. In addition, the lower frame 250 houses the lower surface and both side surfaces of the battery cell assembly 100, and may be a U-shaped frame in which the front and rear surfaces are opened.

Further, referring to FIGS. 1 and 3, the lower frame 250 may include a partition wall part 251 located between the first battery cell assembly 101 and the second battery cell assembly 102. Here, the partition wall part 251 is formed in the center of the lower frame 250, but may be a beam that extends toward the upper frame 210. More specifically, the partition wall part 251 may be integrated with the lower frame 250 or may be fixed to the center of the lower frame 250 by a joining method such as weld-joining.

Thereby, the module frame 200 is configured such that the first battery cell assembly 101 and the second battery cell assembly 102 can be protected each other from external impact by the partition wall part 251. In addition, when an ignition phenomenon occurs in the first battery cell to assembly 101, heat transfer to the second battery cell assembly 102 can be prevented, and vice versa.

Further, the upper frame 210 may be made of a material having a melting point higher than the melting point of the material constituting the lower frame 250. More specifically, the upper frame 210 may be made of a material that is not susceptible to high-temperature gas and/or flame and has relatively high heat resistance as compared to the lower frame 250.

In one example, the upper frame 210 is made of a steel material, and the lower frame 250 may be made of an aluminum (Al) material. In general, the melting point of steel material is 1500 degrees Celsius, and the melting point of aluminum material is 700 degrees Celsius.

Figure 4:
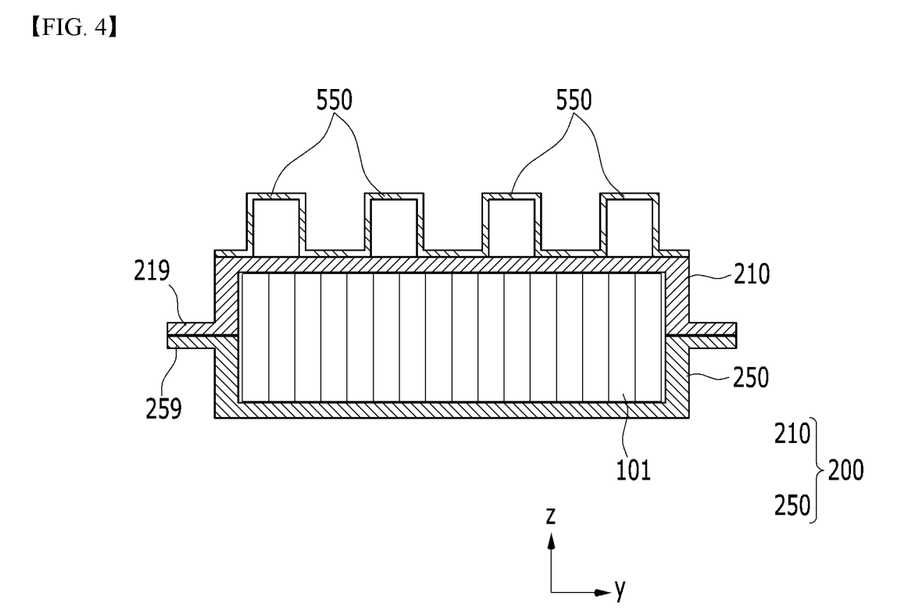
FIG. 4 is a diagram showing a cross-section taken along the cutting line A-A' of FIG. 1.

Particularly, high-temperature gas and/or flame generated by the ignition phenomenon of some battery cell assemblies within the battery module 1000 may flow into the venting hole 215 of the upper frame 210 according to the pressure difference. At this time, the upper frame 210 is made of a material having a relatively high heat resistance and thus, the battery module 1000 of the present embodiment can safely and effectively discharge high-temperature gas and/or flame through the venting path 550 (FIG. 4).

Further, referring to FIGS. 1 to 3, the battery module 1000 of the present embodiment may include a heat sink 400 located under the lower frame 250. More specifically, a part of the front and rear surfaces of the lower frame 250 may include a lower frame protrusion 250*p* formed so as to extend from the bottom surface of the lower frame 250 and pass through the end plate 300. At this time, the refrigerant that flows in and discharges by the cooling port 450 connected to the upper surface of the lower frame protrusion 250*p* may be supplied to and discharged from the heat sink 400 through the lower frame protrusion 250*p* and the heat sink 400.

Specifically, the cooling port 450 includes a refrigerant injection port for injecting a refrigerant into the heat sink 400 and a refrigerant discharge port for discharging the refrigerant from the heat sink 400. Here, the refrigerant injection port may be located in the lower frame protrusion 250*p* located on the front surface of the lower frame 250, and the refrigerant discharge port may be located on the lower frame protrusion 250*p* located on the rear surface of the lower frame 250. However, a case where the positions of the refrigerant injection port and the refrigerant discharge port are reversed may also be included in the present embodiment.

Further, the heat sink 400 may include a heat sink protrusion 400*p* that protrudes from one side of the heat sink 400. Here, the heat sink protrusion 400*p* may be formed at a position corresponding to the lower frame protrusion 250*p*. As an example, the heat sink protrusion 400P and the lower frame protrusion 250*p* may be directly coupled to each other by a method such as welding.

A recessed part 410 recessed in a direction opposite to the direction toward the bottom surface of the lower frame 250 may be included. Here, the recessed part 410 may be a U-shaped tube whose cross section is cut vertically in the xz plane or yz plane with respect to the direction in which a refrigerant flow path extends, and the bottom surface of the lower frame 250 may be located on the open upper side of the U-shaped tube. While the heat sink 400 is in contact with the bottom surface of the lower frame 250, a space between the recessed part 410 and the bottom surface of the lower frame 250 may be an area through which refrigerant flows. Thereby, the bottom surface of the lower frame 250 may be in direct contact with the refrigerant.

The manufacturing method of the recessed part 410 of the heat sink 400 is not particularly limited, but by providing a structure recessed and formed with respect to the plate-shaped heat sink 400, a U-shaped recessed part 410 opened in its upper side can be formed.

The recessed part 400 may extend from one of the heat sink protrusions 400P to the other. The refrigerant supplied through the refrigerant injection port of the cooling port 450 passes between the lower frame protrusion 250*p* and the heat sink protrusion 400*p*, and first flows into the space between the recessed part 410 and the bottom surface of the lower frame 250. Then, the refrigerant moves along the recessed part 410, passes between the other module frame lower frame protrusion 250p and the heat sink protrusion 400p, and is discharged through the refrigerant discharge port of the cooling port 450.

Further, according to the present embodiment, due to the cooling integrated structure of the bottom surface of the lower frame 250 and the heat sink 400 as described above, not only the cooling performance can be improved, but also the load of the battery cell assembly 100 housed in the module frame 200 can be supported and the rigidity of the battery module 1000 can be reinforced. In addition, by sealing the bottom surface of the lower frame 250 and the heat sink 400 by welding or the like, the refrigerant can flow through the recessed part 410 of the heat sink 400 without leakage.

For effective cooling, the recessed part 410 is preferably formed over the entire area corresponding to the bottom surface of the lower frame 250 as shown in FIG. 2. For this purpose, the recessed part 410 can be bent at least once and extend from one side to the other. In particular, the recessed part 340 is preferably bent several times to form the recessed part 340 over the entire area corresponding to the bottom surface of the lower frame 250. As the refrigerant moves from the start point to the end point of the refrigerant flow path formed over the entire area corresponding to the bottom surface of the lower frame 250, efficient cooling of the entire area of the battery cell assembly 100 can be achieved. Meanwhile, the refrigerant is a medium for cooling, and not particularly limited, but may be cooling water.

Meanwhile, referring again to FIG. 2, a protrusion pattern may be formed in the recessed part 410 of the heat sink 400 according to the present embodiment.

In the case of a large-area battery module in which the number of stacked battery cells increases significantly compared to the conventional case, similarly to the battery cell assembly 100 according to the present embodiment, the width of the refrigerant flow path may be formed wider and thus, the temperature deviation may become more severe. Particularly, in a large-area battery module, it may include the case where about 32 to 48 battery cells are stacked in one battery module, as compared with the case where about 12 to 24 battery cells are stacked in one battery module. In such a case, the protrusion pattern formed in the recessed part 410 according to the present embodiment generates the effect of substantially reducing the width of the cooling flow path, thereby minimizing the pressure drop and at the same time, reducing the temperature deviation between the refrigerant flow path widths. Therefore, it is possible to realize a uniform cooling effect.

Next, the venting cover 500 included in the battery module 1000 according to an embodiment of the present disclosure and the venting hole 215 formed in the upper frame 210 will be mainly described.

Figure 5:
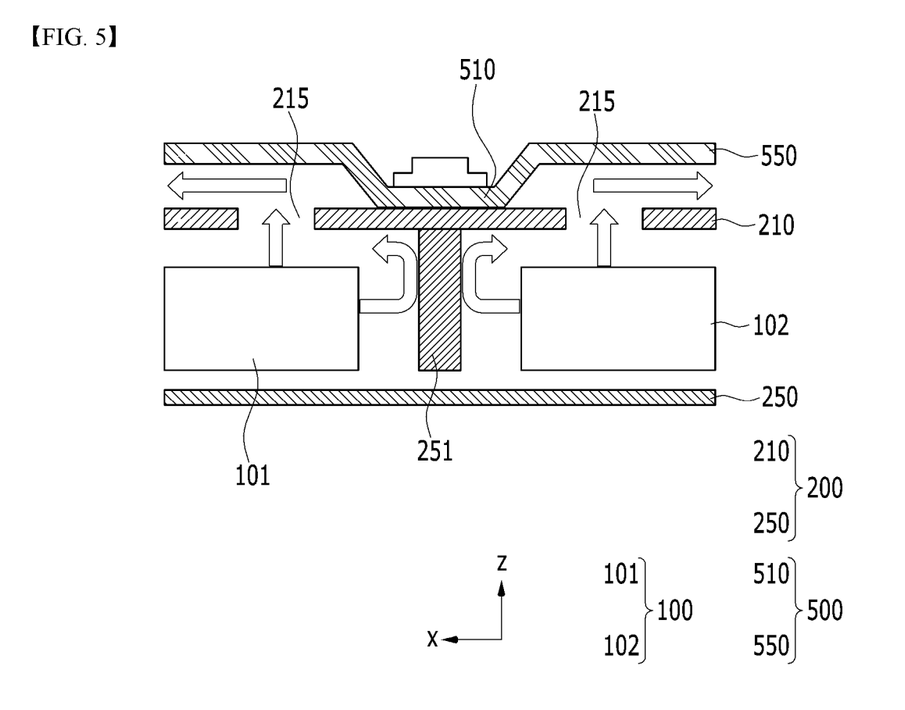
FIG. 5 is a diagram showing a cross-section taken along the cutting line B-B' of FIG. 1.

FIG. 4 is a diagram showing a cross-section taken along the cutting line A-A' of FIG. 1. FIG. 5 is a diagram showing a cross-section taken along the cutting line B-B' of FIG. 1.

Referring to FIGS. 1, 4 and 5, the battery module 1000 according to the present embodiment may include a venting cover 500 located on the upper frame 210. More specifically, the venting cover 500 extends along the longitudinal direction of the upper frame 210, and may include a venting part 550 that protrudes outward with respect to the upper surface of the upper frame 210. Further, the upper surface of the upper frame may constitute the bottom surface of the venting cover.

Further, the upper surface of the upper frame 210 may constitute a bottom surface of the venting cover 500. As an example, the venting part 550 may be a U-shaped tube whose cross section is cut in the xz plane or the yz plane perpendicular to the direction in which the venting flow path extends, and the upper surface of the upper frame 210 may be located on the opened lower side of the U-shaped tube. That is, while the venting cover 500 is in contact with the upper surface of the upper frame 210, the space between the venting part 550 and the upper surface of the upper frame 210 may be a venting path through which high-temperature gas and/or flame generated in some battery cells in the battery module 1000 are discharged.

The manufacturing method of the venting part 550 of the venting cover 500 is not particularly limited, but a U-shaped venting part 550 having an opened lower side can be formed by providing a structure protruding from the plate-shaped venting cover 500.

Further, according to the present embodiment, due to the integrated structure of the upper surface of the upper frame 210 and the venting cover 500 as described above, not only the venting performance can be improved but also the rigidity of the battery module 1000 can be reinforced. In addition, as the upper surface of the upper frame 210 and the venting cover 500 are sealed through welding, etc., a high-temperature gas and/or flame can flow without leakage and be discharged to the outside in the venting path formed between the venting part 550 of the venting cover 500 and the upper surface of the upper frame 210.

Further, in the venting cover 500, the venting part 550 may have a shape that is bent a plurality of times along the width direction of the battery cell assembly. Here, referring to the cross section of the venting cover 500 as shown in FIG. 4, the shape bent a plurality of times may mean that a plurality of areas protruding outward with respect to the upper surface of the upper frame 210 are formed but are spaced apart from each other. Here, the width direction of the battery cell assembly 100 refers to the y-axis direction as shown in FIGS. 4 and 5. That is, the venting passage formed between the upper surface of the upper frame 210 and the at least one venting part 550 may also be spaced apart from each other.

More specifically, when the high-temperature gas and/or flame generated in some battery cell assemblies 100 is flown into the venting cover 500, the high-temperature gas and/or flame may flow in any one of the venting flow paths spaced apart from each other and be discharged to the outside. At this time, since the venting flow paths are separated from each other, direct heat transfer between the venting flow paths can be prevented. In addition, by increasing the contact area for the high temperature gas and/or flame, the high temperature gas and/or flame is cooled while passing through the venting flow path, so that high-temperature gas and/or flame can be discharged to the outside more safely.

Further, referring to FIGS. 1 to 3 and 5, the venting part 550 may include a first venting part and a second venting part. Here, the first venting part and the second venting part may be separated from each other. More specifically, the first venting part extends along the longitudinal direction of the first battery cell assembly 101, and the second venting part may extend along the longitudinal direction of the second battery cell assembly 102. In other words, in the venting cover 500, the first venting part is formed at a position facing the upper surface of the first battery cell assembly 101, and the second venting part is formed at a position facing the upper surface of the second battery cell assembly 102.

In one example, referring to FIGS. 1 and 5, the central part 510 of the venting cover 500 is in contact with the upper surface of the upper frame 210, and the first venting part and the second venting part may be separated from each other on the basis of the central part 510 of the venting cover 500. That is, in the plate-shaped venting cover 500, the central part 510 is located between the first venting part and the second venting part, but the central part 510 may be an area without portion formed protrusively like a venting part 550.

Thereby, in the venting cover 500, the first venting part and the second venting part are separated from each other by a central part 510, and each venting flow path for the first battery cell assembly 101 and the second battery cell assembly 102 may be formed as shown in FIG. 5. That is, when an ignition phenomenon occurs in the battery cell assembly 100, high-temperature gas and/or flame are discharged through a venting flow path that is separated from each other, so that heat transfer to other battery cell assemblies can be prevented when high-temperature gas and/or flame are discharged.

Further, referring to FIGS. 1 and 5, in the venting cover 500, one side of the venting part 550 may be closed by the central part 510, and the other side of the venting part 550 may be opened toward the outside.

Therefore, in the battery module 1000 according to the present embodiment, the high-temperature gas and/or flame flowed into the venting cover 500 may move toward the other side of the venting part 550 that is opened to the outside, and can be discharged to the outside. In particular, in the venting part 550, the other sides of the first venting part and the second venting part are located in opposite directions to each other as shown in FIGS. 1 and 5, respectively, so that the venting directions of the venting flow path of the first battery cell assembly 101 and the venting flow path of the second battery cell assembly 102 are induced in opposite directions to each other, and heat transfer to other battery cell assemblies can be prevented when high-temperature gases and/or flames are discharged.

Further, referring to FIGS. 2 and 5, the upper frame 210 may include at least one venting hole 215 communicating with the venting part 550. Here, the venting hole 215 may extend along the width direction (y-axis direction) of the battery cell assembly 100.

More specifically, the venting hole 215 may mean a hole opened toward the inside of the module frame 200 in the upper frame 210. In other words, in the upper frame 210, the venting hole 215 may be an area in which a part of the upper frame 210 is removed so that a part of the inside of the module frame 200 is exposed. In particular, the venting hole 215 may be a hole opened toward an area located adjacent to at least one of one surface of the first battery cell assembly and one surface of the second battery cell assembly.

Thereby, in the battery module 1000 according to the present embodiment, high-temperature gas and/or flame generated by the ignition phenomenon of some battery cell assemblies 100 can be flown into the venting part 550 through the venting hole 215 formed in the upper frame 210 due to the pressure difference. That is, the high-temperature gas and/or flame flown into the venting part 550 can be effectively discharged to the outside by the pressure difference.

As an example, as shown in FIGS. 2 and 5, the venting hole 215 includes a first venting hole and a second venting hole, the first venting hole is located adjacent to one surface facing the second battery cell assembly 102 among the front and rear surfaces of the first battery cell assembly 101, and the second venting hole may be located adjacent to one of the front and rear surfaces of the second battery cell assembly 102 facing the first battery cell assembly 101. In other words, the first venting hole is formed at a position facing the upper surface of the first battery cell assembly 101, but may be located adjacent to the partition wall part 251, and the second venting hole is formed at a position facing the upper surface of the second battery cell assembly 102, but may be located adjacent to the partition wall part 251.

Thereby, the first venting hole and the second venting hole are located adjacent to the center of the upper frame 210, and the distance that the high-temperature gas and/or flame flow can be maximized in the venting flow path formed by the venting hole 215 and the venting part 550, whereby the high-temperature gas and/or flame is effectively cooled while passing through the venting flow path formed between the venting part 550 and the upper frame 210, and high-temperature gas and/or flame can be discharged to the outside more safely.

Next, the upper frame 210 and the lower frame 250 included in the battery module 1000 according to an embodiment of the present disclosure will be mainly described.

Figure 6:
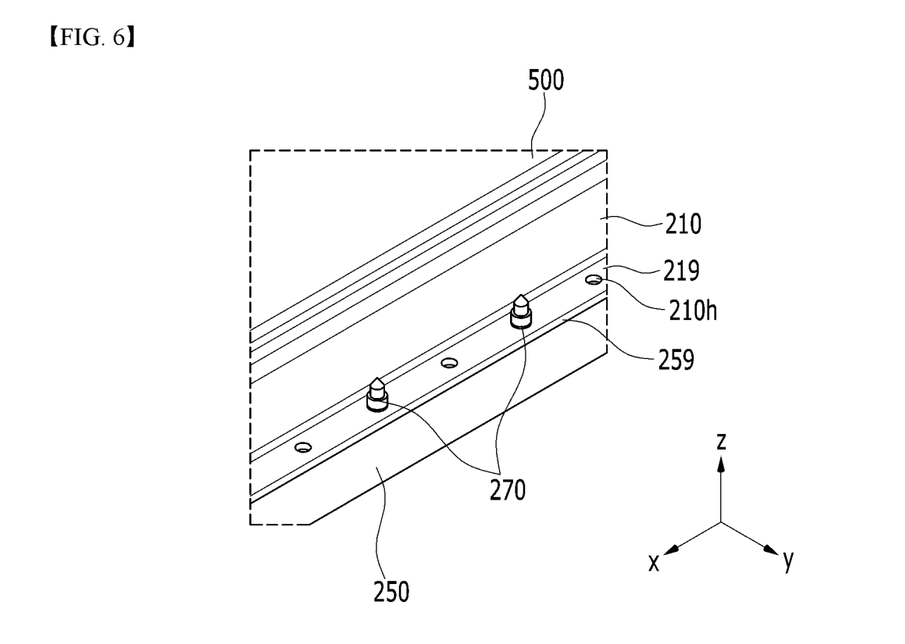
FIG. 6 is an enlarged view of the side surface of the battery module of FIG. 1.
Figure 7:
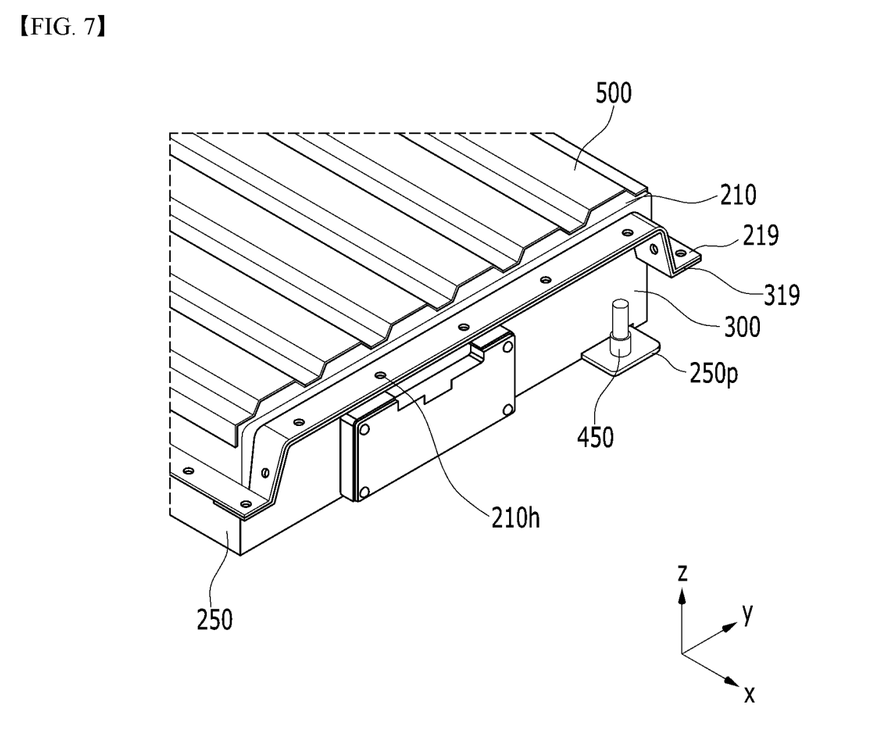
FIG. 7 is an enlarged view of the front surface of the battery module of FIG. 1.

FIG. 6 is an enlarged view of the side surface of the battery module of FIG. 1. FIG. 7 is an enlarged view of the front surface of the battery module of FIG. 1.

Referring to FIGS. 1 to 3, and FIG. 6, the side surface of the upper frame 210 has a first outer peripheral surface 219 that is bent outward with respect to the upper frame 210, the side surface of the lower frame 250 has a second outer peripheral surface 259 that is bent outward with respect to the lower frame 250, and the first outer peripheral surface 219 and the second outer peripheral surface 259 may be in contact with each other. Here, the outward direction may be a direction opposite to the direction toward the battery cell assembly 100 with respect to the side surface of the module frame 200.

In one example, the first outer peripheral surface 219 and the second outer peripheral surface 259 may be fixed by a bolt coupling. Here, the bolt coupling may mean coupling to the first fixing hole 210h formed on the first outer peripheral surface 219 by a fixing member 270 such as a bolt or a nut. At this time, even in the case of the second outer peripheral surface 259, a hole may be formed at a position corresponding to the first fixing hole 210h.

Further, referring to FIGS. 1 to 3, and FIG. 7, the end plate 300 may include a third outer peripheral surface 319 that is bent outward with respect to the end plate 300. Here, the first outer peripheral surface 219 extends along the front and rear surfaces of the upper frame 210, respectively, and the first outer peripheral surface 219 and the third outer peripheral surface 259 may be in contact with each other.

In one example, the first outer peripheral surface 219 and the third outer peripheral surface 319 may be fixed by a bolt coupling. Here, the bolt coupling may mean coupling to the first fixing hole 210h formed on the first outer peripheral surface 219 by a fixing member 270 (FIG. 6) such as a bolt or a nut. At this time, even in the case of the third outer peripheral surface 319, a hole may be formed at a position corresponding to the first fixing hole 210h.

Thereby, as described above, the upper frame 210 and the lower frame 250 are made of materials having different melting points, and thus, it is difficult to apply joining such as laser welding, but the inside of the module frame 200 can be effectively sealed from the external environment through a fixing method such as a bolt coupling between the first outer peripheral surface 219 and the second outer peripheral surface 259.

Figure 8:
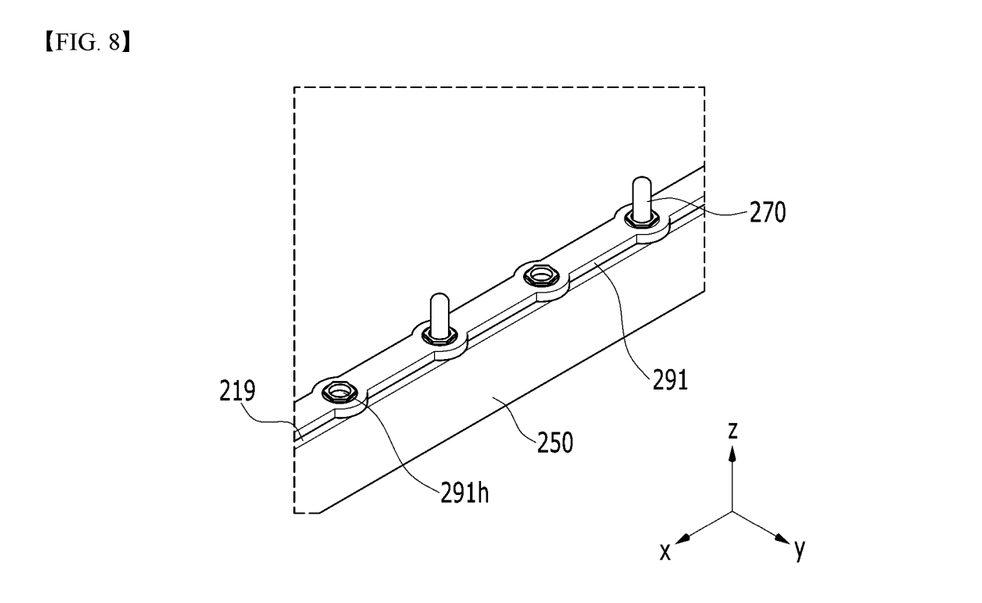
FIG. 8 is a view in which the upper frame and the venting cover in FIG. 6 are removed.
Figure 9:
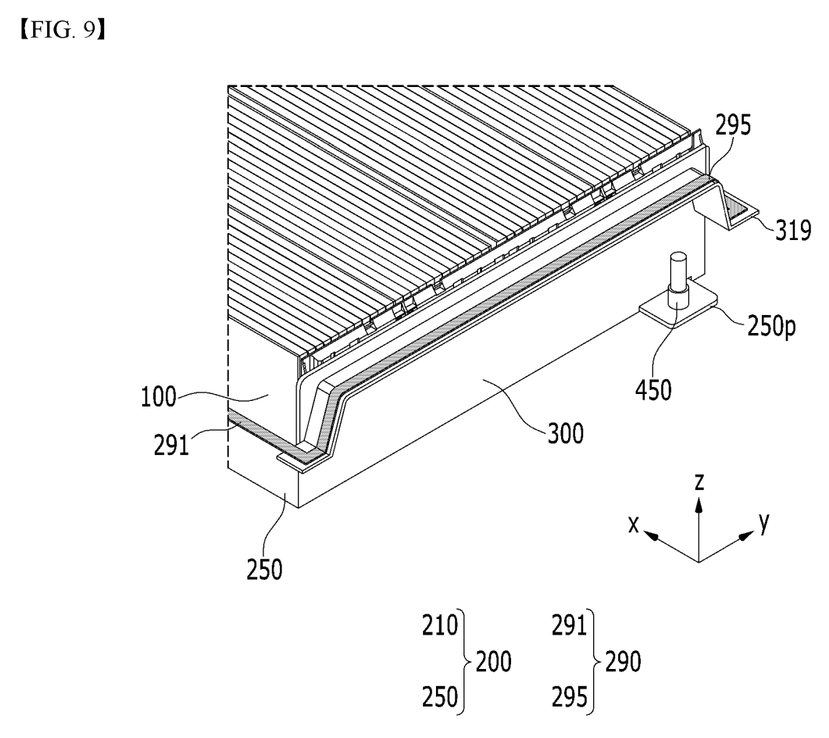
FIG. 9 is an enlarged view of the rear surface of the battery module of FIG. 1, with the upper frame and the venting cover being removed.

FIG. 8 is a view in which the upper frame and the venting cover in FIG. 6 are removed. FIG. 9 is an enlarged view of the rear surface of the battery module of FIG. 1, with the upper frame and the venting cover being removed.

Referring to FIGS. 1, 6 and 8, in the battery module 1000 according to the present embodiment, a first gasket part 291 of a gasket part 290 may be located between the first outer peripheral surface 219 and the second outer peripheral surface 259. More specifically, the first gasket part 291 may extend along between the first outer peripheral surface 219 and the second outer peripheral surface 259.

Referring to FIGS. 1, 7 and 9, in the battery module 1000 according to the present embodiment, a second gasket part 295 of a gasket part 290 may be located between the first outer peripheral surface 219 and the third outer peripheral surface 319. More specifically, the second gasket part 295 may extend along between the first outer peripheral surface 219 and the third outer peripheral surface 319.

Here, the first gasket part 291 and the second gasket part 295 may be manufactured by molding or injection according to a predetermined shape, respectively, or may be formed by applying a previously prepared solution.

Thereby, in the present embodiment, the first gasket part 291 and the second gasket part 295 are located between the upper frame 210 and the lower frame 250 or the end plate 300, respectively, thereby capable of sealing between the upper frame 210 and the lower frame 250 or the end plate 300. In particular, the first gasket part 291 can effectively seal the area located between the bolt couplings in that the space between the upper frame 210 and the lower frame 250 is fixed by a fixing method such as bolt coupling.

In one example, the first gasket part 291 may include a plurality of through-holes 291*h* spaced apart from each other. Here, the plurality of through-holes 291*h* are located at the same positions as the first fixing holes 210*h* formed on the first outer peripheral surface 219 and the holes formed at positions corresponding to the first fixing holes 210*h* in the second outer peripheral surface 259.

Thereby, according to the present embodiment, the first gasket part 291 is located between the upper frame 210 and the lower frame 250, but can be fixed together with the upper frame 210 and the lower frame 250 through the through hole 291*h*, thereby capable of preventing the first gasket part 291 from being separated between the upper frame 210 and the lower frame 250.

Next, the venting valve 350 included in the battery module 1000 according to an embodiment of the present disclosure will be mainly described.

Figure 10:
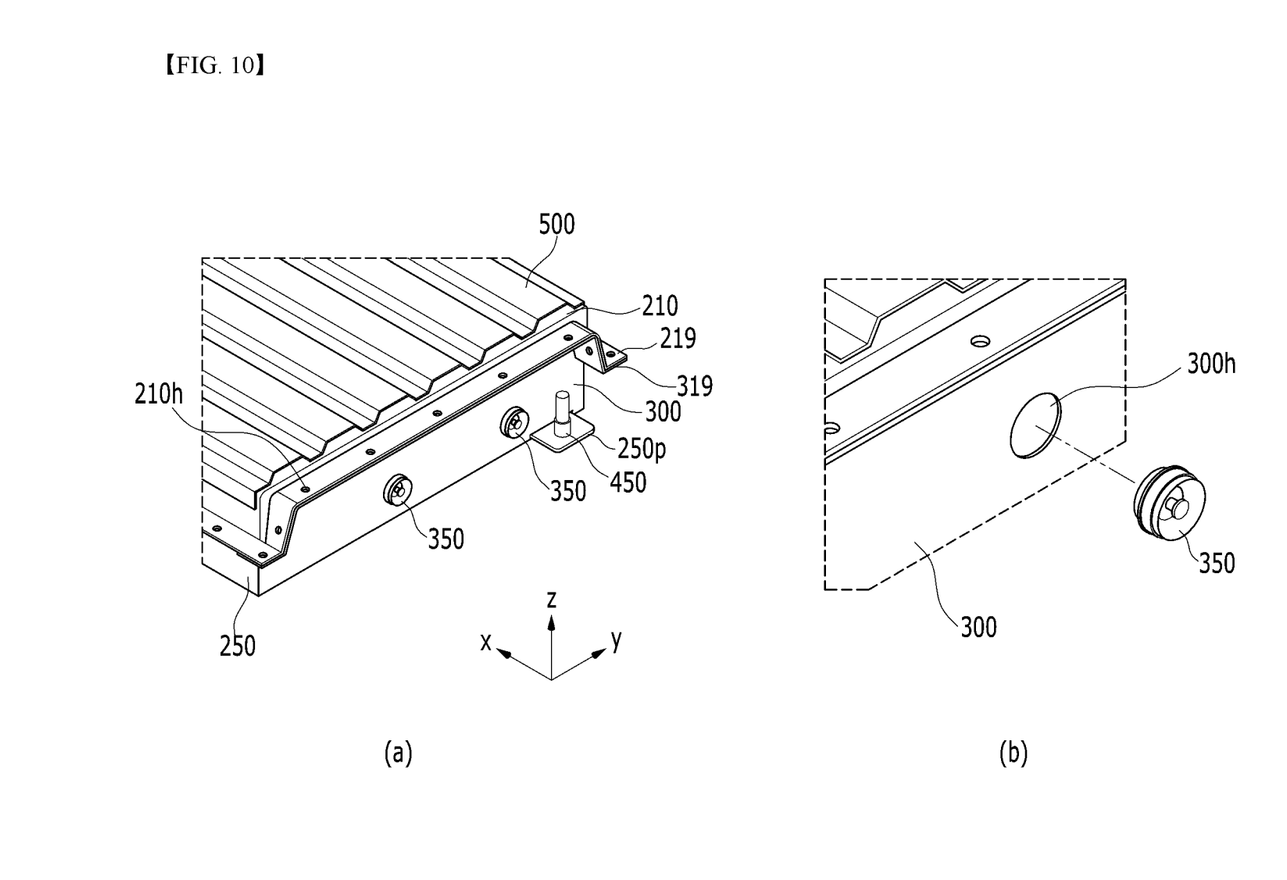
FIG. 10 is an enlarged view showing the rear surface of the battery module according to another embodiment of the present disclosure.

FIG. 10 is an enlarged view showing the rear surface of the battery module according to another embodiment of the present disclosure.

Referring to FIG. 10, the battery module 1000 according to another embodiment of the present disclosure may further include at least one venting valve 350 in the end plate 300. More specifically, as shown in FIG. 10(*b*), the venting valve 350 may be inserted into a hole 300*h* formed by removing at least a part of the end plate 300.

Here, the venting valve 350 is connected to the inside of the battery module 1000, and is opened toward the outside only when the pressure in the battery module 1000 becomes equal to or higher than a certain pressure, and may be composed of a member that is closed when the pressure is below a certain level. In one example, the venting valve 350 may be a relief valve. Here, the relief valve may include a valve stopper closing the hole 300*h* of the end plate 300 and a spring connected to the valve stopper, and when the pressure in the battery module 1000 is greater than the elastic force of the spring, the hole 300*h* of the end plate 300 may have a structure that is opened to the outside. However, the venting valve 350 is not limited thereto, and any member that can be opened and closed according to the pressure of the battery module 1000 may be included in the present embodiment. In addition, the position and number of the venting valve 350 may be appropriately selected as needed.

Thereby, in the battery module 1000 according to the present embodiment, when the pressure in the battery module 1000 becomes excessively large, the venting valve 350 formed on the end plate 300 is opened toward the outside, and thus, gas and/or flame in the battery module 1000 may be discharged to the outside, thereby preventing damage to the battery module 1000. In addition, when the pressure inside the battery module 1000 is included in the normal range, the venting valve 350 may close the inside and outside of the battery module 1000, so that in normal operation of the battery module 1000, external gas or moisture can be prevented from penetrating into the battery module 1000.

Meanwhile, one or more battery modules according to the present embodiment may be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and the battery pack including the same, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

The invention claimed is:

1. A battery module comprising:
 a battery cell assembly including a first battery cell assembly and a second battery cell assembly in which a plurality of battery cells are stacked, respectively;
 an upper frame that houses an upper surface and opposite side surfaces of the battery cell assembly and is opened in front and rear surfaces;
 a lower frame that houses a lower surface and the opposite side surfaces of the battery cell assembly and is opened in front and rear surfaces; and
 end plates that are respectively located on a surface that is adjacent to an outer side from among front and rear surfaces of the first battery cell assembly and a surface that is adjacent to the outer side from among front and rear surfaces of the second battery cell assembly,
 wherein the first battery cell assembly and the second battery cell assembly are arranged separately in a direction facing each other, and
 wherein the upper frame includes a material having a melting point higher than a melting point of a material constituting the lower frame.

2. The battery module according to claim 1, comprising:
 a venting cover located on the upper frame,
 wherein the venting cover comprises a venting part that extends along a longitudinal direction of the upper frame and protrudes outward with respect to an upper surface of the upper frame.

3. The battery module according to claim 2, wherein:
the upper surface of the upper frame constitutes a bottom surface of the venting cover.

4. The battery module according to claim 2, wherein:
the venting part has a shape that is bent a plurality of times along a width direction of the battery cell assembly.

5. The battery module according to claim 2, wherein:
the venting part comprises a first venting part and a second venting part,
the first venting part extends along a longitudinal direction of the first battery cell assembly, and
the second venting part extends along a longitudinal direction of the second battery cell assembly.

6. The battery module according to claim 5, wherein:
a central part of the venting cover is in contact with the upper surface of the upper frame, and
the first venting part and the second venting part are separated from each other with respect to the central part of the venting cover.

7. The battery module according to claim 2, wherein:
the upper frame comprises at least one venting hole communicating with the venting part.

8. The battery module according to claim 7, wherein:
the at least one venting hole comprises a first venting hole and a second venting hole,
the first venting hole is located adjacent to one surface facing the second battery cell assembly among the front and rear surfaces of the first battery cell assembly, and
the second venting hole is located adjacent to one surface facing the first battery cell assembly among the front and rear surfaces of the second battery cell assembly.

9. The battery module according to claim 7, wherein:
the at least one venting hole extends along a width direction of the battery cell assembly.

10. The battery module according to claim 1, wherein:
the lower frame includes a partition wall part that is located between the first battery cell assembly and the second battery cell assembly.

11. The battery module according to claim 1, wherein:
one of the opposite side surfaces of the upper frame has a first outer peripheral surface that is bent outward with respect to the upper frame,
one of the opposite side surfaces of the lower frame has a second outer peripheral surface that is bent outward with respect to the lower frame, and
the first outer peripheral surface and the second outer peripheral surface are in contact with each other.

12. The battery module according to claim 11, wherein:
the first outer peripheral surface and the second outer peripheral surface are fixed by a bolt coupling.

13. The battery module according to claim 11, wherein:
a first gasket part is located between the first outer peripheral surface and the second outer peripheral surface.

14. The battery module according to claim 11, wherein:
at least one of the end plates comprises a third outer peripheral surface that is bent outward with respect to the at least one of the end plates,
the first outer peripheral surface extends along the front and rear surfaces of the upper frame, respectively, and
the first outer peripheral surface and the third outer peripheral surface are in contact with each other.

15. The battery module according to claim 14, wherein:
the first outer peripheral surface and the third outer peripheral surface are fixed by a bolt coupling.

16. The battery module according to claim 15, wherein:
a second gasket part is located between the first outer peripheral surface and the third outer peripheral surface.

17. The battery module according to claim 1, wherein:
at least one of the end plates comprises at least one venting valve.

18. The battery module according to claim 1, wherein:
the upper frame includes a steel material, and
the lower frame includes an aluminum material.

19. The battery module according to claim 1, further comprising:
a heat sink located under the lower frame,
wherein the heat sink comprises a recessed part that is recessed in a direction opposite to a direction toward a bottom surface of the lower frame, and
wherein the bottom surface of the lower frame constitutes an upper surface of the heat sink.

20. A battery pack comprising the battery module according to claim 1.

* * * * *